US00RE40975E

(19) United States
(12) Reissued Patent
Evans et al.

(10) Patent Number: US RE40,975 E
(45) Date of Reissued Patent: Nov. 17, 2009

(54) HEAD SUSPENSION WITH RESONANCE FEEDBACK TRANSDUCER

(75) Inventors: Robert B. Evans, Hutchinson, MN (US); Todd A. Krinke, Rockford, MN (US)

(73) Assignee: Hutchinson Technology Incorporated, Hutchinson, MN (US)

(21) Appl. No.: 11/452,076

(22) Filed: Jun. 9, 2006

Related U.S. Patent Documents

Reissue of:
(64) Patent No.: 5,862,015
Issued: Jan. 19, 1999
Appl. No.: 08/861,530
Filed: May 22, 1997

U.S. Applications:
(60) Provisional application No. 60/018,167, filed on May 23, 1996.

(51) Int. Cl.
*G11B 21/02* (2006.01)
*G11B 5/596* (2006.01)
*G11B 5/48* (2006.01)

(52) U.S. Cl. ..... 360/244.1; 360/77.03; 360/78.05; 360/75

(58) Field of Classification Search ..... None
See application file for complete search history.

(56) References Cited

U.S. PATENT DOCUMENTS 5,014,145 A * 5/1991 Hosokawa et al. ..... 360/104
5,142,424 A * 8/1992 Hatamura ..... 360/104
5,335,126 A * 8/1994 Tokyuama et al. ..... 360/104
5,339,208 A * 8/1994 Yumura et al. ..... 360/104
5,471,734 A * 12/1995 Hatch et al. ..... 29/603
5,526,208 A * 6/1996 Hatch et al. ..... 360/294.1
5,657,188 A * 8/1997 Jurgenson et al. ..... 360/106

FOREIGN PATENT DOCUMENTS

JP 04271072 A * 9/1992

OTHER PUBLICATIONS

Yamaguchi, Y., et al.; Flow Induced Vibration of Magnetic Head Suspension in Hard Disk Drive; IEEE Transactions on Magnetics; Sep. 1986; 1022–1024; MAG–22, #5; IEEE USA.
D'Amico, "Disk Drives Go Micro", Berkley Engineering Forefront 1996, 3 pgs.*
Lee et al., "Piezoelectric model sensor/actuator pairs for critical active damping vibrational control", J. Acoust. Soc. Am., vol. 90, No. 1, Jul. 1991, pp. 374–384.*

* cited by examiner

*Primary Examiner*—Jason C Olson
(74) *Attorney, Agent, or Firm*—Faegre & Benson LLP

(57) ABSTRACT

A head suspension assembly including a load beam having a rigid region, a mounting region on a proximal end of the load beam, and a flexure on a distal end of the load beam. The flexure has a read/write head attachment region for supporting a read/write head on the distal end of the load beam. Deformation of the head suspension assembly displaces the head attachment region. A strain transducer circuit that acts as a strain gauge is mounted on the head suspension assembly. The resistance of the transducer circuit varies with strain in the circuit, which, in turn, varies with displacement of the read/write head. The magnitude of resistance change of the transducer circuit indicates the magnitude of head off-neutral motion.

22 Claims, 8 Drawing Sheets

HEAD SUSPENSION WITH RESONANCE FEEDBACK TRANSDUCER

Matter enclosed in heavy brackets [ ] appears in the original patent but forms no part of this reissue specification; matter printed in italics indicates the additions made by reissue.

REFERENCE TO RELATED APPLICATION

This application claims the benefit of U.S. Provisional application Ser. No. 60/018,167, filed May 23, 1996 abandoned.

BACKGROUND OF THE INVENTION

1. Field of the Invention

The present invention relates generally to suspensions for supporting read/write heads over recording media. In particular, the present invention relates to a head suspension assembly with a strain transducer circuit thereon for detecting motion of the head suspension assembly out of a neutral position.

2. Description of the Related Art

Information storage devices typically include a read/write head for reading and/or writing data onto a storage medium such as a magnetic disk within a rigid disk drive. An actuator mechanism driven by a servo control is used to position the head at specific radial locations or tracks on the magnetic disk. Both linear and rotary type actuators are well known in the art. Between the actuator and the head, a head suspension is required to support the head in proper orientation relative to the disk surface.

The head suspension carries the read/write head so that the head can "fly" over the surface of the rigid disk while the disk is spinning. The head is typically located on a head slider having an aerodynamic design so that the head slider flies on an air bearing generated by the spinning disk. The combination of the head slider and the head suspension is referred to as a head suspension assembly. The head suspension includes a load beam which has a radius or spring section, a rigid region, and a flexure. The flexure is a spring or gimballing connection typically included between the head slider and the rigid section of the load beam so that the head slider can move in the pitch and roll directions of the head to accommodate fluctuations of the disk surface. The mounting region of the load beam is typically attached to an actuator arm which supports the suspension assembly over the rotating disk. A base of the actuator arm is coupled to an actuator.

When no external forces (with the exception of gravity) are acting on the head suspension assembly to deform it in any way, it is in a "neutral un-loaded" state. When the head is flying over the spinning surface of a disk, and is acted upon only by the force of the air bearing generated by the spinning disk, the head suspension assembly is in a "neutral loaded" state. However, the head suspension assembly can experience deformations that cause motion of the head away from either the neutral loaded or neutral un-loaded positions.

One way these deformations can occur involves a head suspension's tendency to bend and twist in a number of different modes, known as resonant frequencies, when driven back and forth at certain rates. Any such bending or twisting of a suspension can cause the position of the head to deviate from its neutral loaded or neutral un-loaded position.

Common bending and twisting modes of suspensions are generally known and discussed, for example, in the Yumura et al. U.S. Pat. No. 5,339,208 and the Hatch et al. U.S. Pat. No. 5,471,734. Modes which result in lateral or transverse motion (also known as off-track motion) of the head slider are particularly detrimental since this motion causes the head slider to move from the desired track on the disk toward an adjacent track. The three primary modes which produce this transverse motion are known as the sway, first torsion, and second torsion modes. The sway mode is a lateral bending mode in which the suspension bends in a transverse direction along its entire length. The first and second torsion modes are twisting modes during which the suspension twists about a rotational axis which extends along the length of the suspension.

Deformation of the suspension can also be caused by a secondary-actuation or microactuation device designed to move the head relative to the remainder of the head suspension assembly. Such a microactuation device is disclosed in U.S. patent application Ser. No. 08/457,432 filed Jun. 6, 1995 by Jurgenson et al. for a Head Suspension with Tracking Microactuator now U.S. Pat. No. 5,657,188.

Whether generated by motion during resonant modes, a secondary actuation device, or other causes, it can be useful to monitor motion of the head away from a neutral loaded or neutral un-loaded position, that is, read/write head off-neutral motion. Information about head off-neutral motion caused by undesirable resonant vibrations can be used to actively damp such vibrations. Further, monitoring of the displacement of the head caused by a first actuator can be important to correct placement of the head by a second actuator.

SUMMARY OF THE INVENTION

The present invention provides a means for detecting the off-neutral motion of a head mounted on a head suspension assembly. This information can be used to correct head off-neutral motion, if necessary, so that read/write operations can be accomplished relatively quickly and accurately. It can also be used to determine the displacement of a magnetic head caused by a microactuation device to allow accurate placement of the head by a primary actuator. The head suspension assembly includes a load beam having a proximal end, a distal end, a mounting region on the proximal end, and a rigid region adjacent to the distal end. A flexure is at the distal end of the load beam. A strain transducer circuit is located on the head suspension assembly and detects strain in the head suspension assembly. In one embodiment, the flexure includes a head attachment region where the read/write head is attached. Deformation of the head suspension assembly displaces the head attachment region from a neutral position and subjects the head suspension assembly to strain. The strain transducer circuit detects the strain which allows detection of motion of the head attachment region out of the neutral position.

DETAILED DESCRIPTION OF THE PREFERRED EMBODIMENTS

Figure 1:
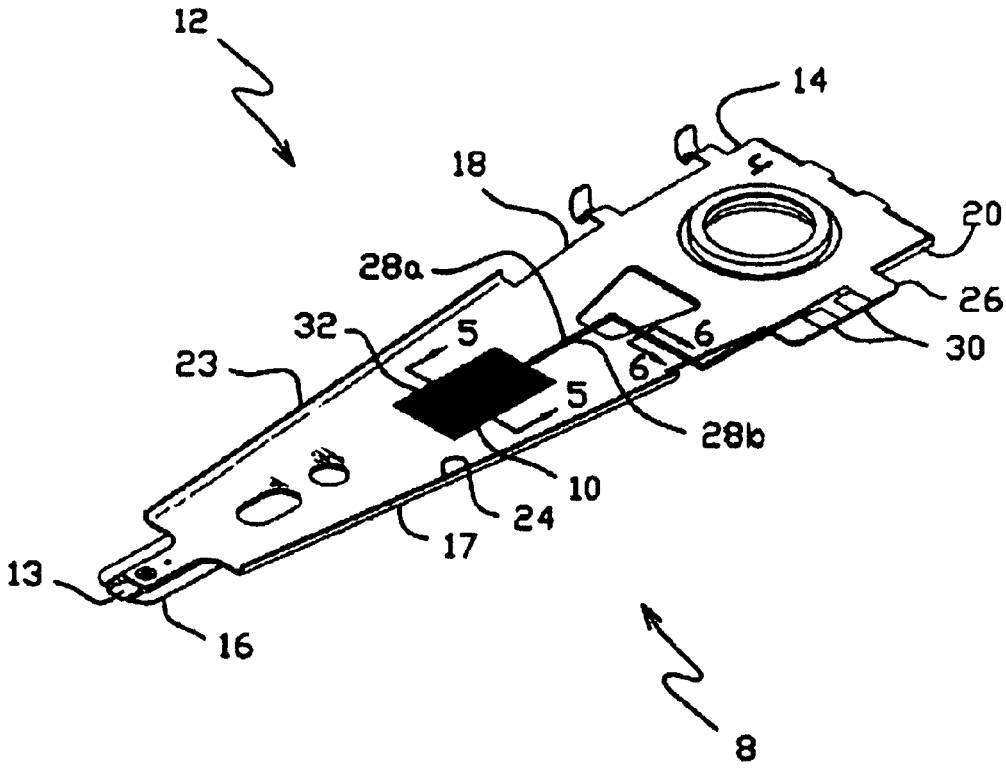
FIG. 1 is an isometric view of a head suspension assembly including a strain transducer circuit on a load beam in accordance with the present invention.

A head suspension assembly 8 which includes a strain transducer circuit 10 in accordance with the present invention is illustrated generally in FIG. 1. As shown, head suspension assembly 8 includes a load beam 12 having a base or mounting region 14 on a proximal end, a flexure 16 on a distal end, a relatively rigid region 17 adjacent to the flexure, and a radius or spring region 18 between the base 14 and rigid region 17. The flexure 16 supports a head slider (not shown) which is mounted on a head attachment region 13 and which "flies" on an air bearing created by a spinning magnetic disk (not shown). The head slider supports a read/write head (not shown) for transferring data to, and reading data from the spinning magnetic disk. A base plate 20 is welded to base 14 for mounting the load beam 12 to a disk drive actuator arm (not shown). Flexure 16 is a spring connection provided between a head slider and the distal end of the load beam 12 which permits the head slider to move in pitch and roll directions so that it can compensate for fluctuations of the spinning disk surface above which the slider flies. Many different types of flexure, also known as gimbals, are known to provide the spring connection allowing for pitch and roll movement of the head slider and can be used with the present invention. First and second edge rails 23 and 24 are formed in transversely opposite sides of the rigid region 17 of load beam 12. Tab 26 which extends from base 14 is used to position and support read/write head lead wires (not shown), transducer circuit lead wires 28a and 28b, and electrical contacts 30.

Figure 5:
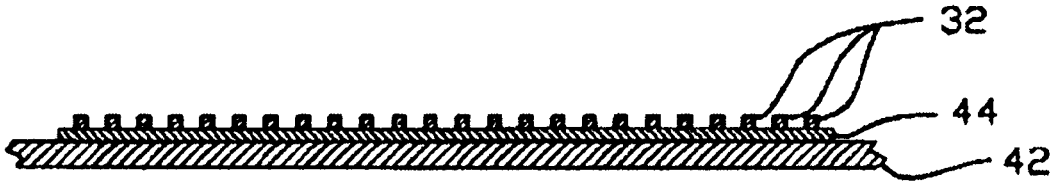
FIG. 5 is a sectional view of the head suspension assembly shown in FIG. 1 taken along line 5—5.
Figure 6:
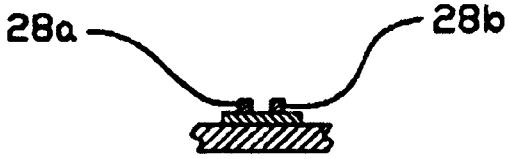
FIG. 6 is a sectional view of the head suspension assembly shown in FIG. 1 taken along line 6—6.

The strain transducer circuit 10 is located in the transverse center of load beam 12 and functions as a strain gauge. Strain gauges are well known in the art and any suitable strain gauge is contemplated to be used with the present invention. In the embodiment of FIG. 1, individual transducer circuit lead 32 of transducer circuit 10 is formed from a single electrical lead which extends longitudinally back and forth in parallel sections connected at ends of the sections. Other orientations and configurations of circuit lead 32 are also within the ambit of the present invention. For example the electrical lead can be configured in a circular spiral or other non-parallel configurations. FIG. 5 is a sectional view of load beam 12 taken along line 5—5 and showing transducer circuit lead 32. Lead wires 28a and 28b are connected to opposite ends of circuit lead 32 to form a continuous closed circuit between lead wires 28a and 28b. FIG. 6 is a sectional view of load beam 12 taken along line 6—6 and showing lead wires 28a and 28b. Lead wires 28a and 28b are connected to contacts 30 on tab 26.

Transducer circuit lead 32 is fabricated of a material in which the electrical resistance varies with strain on the material. In the embodiment of FIG. 1, circuit lead 32 is formed of Constantan, a commercially available nickel-copper alloy. Transducer circuit lead 32 can also be formed of any other material in which electrical resistance varies as the strain on the material varies.

When head suspension assembly 8 is acted upon by no external forces it is in a neutral un-loaded position. When the head suspension assembly 8 is acted on only by the force of the air bearing on which the slider flies, the head suspension assembly is in a neutral loaded (fly-height) position. Hereinafter, the term "neutral" will be used to refer to either the neutral un-loaded position or neutral loaded position. When the head suspension assembly 8 is in a neutral position, it holds the read/write head attachment region 13, and thereby the read/write head (not shown), in a neutral position with respect to a base 14 of the load beam 12. However, head suspension assembly 8 can elastically deform out of neutral position moving the head attachment region 13 out of neutral position. This causes read/write head off-neutral motion.

Figure 2A:
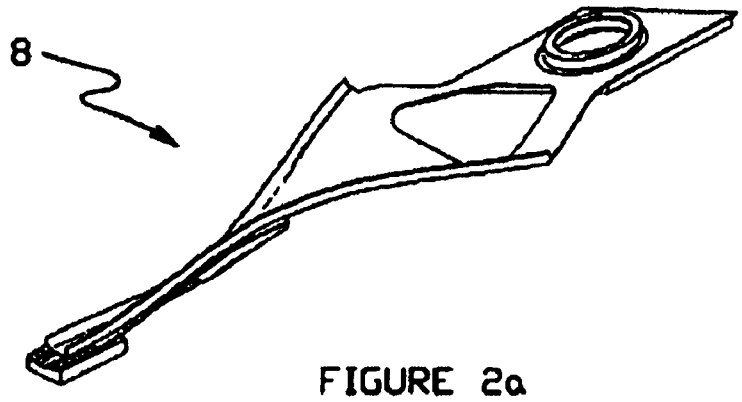
FIG. 2a is an isometric view of the suspension assembly shown in FIG. 1 undergoing twisting motion in the first torsion mode.
Figure 2B:
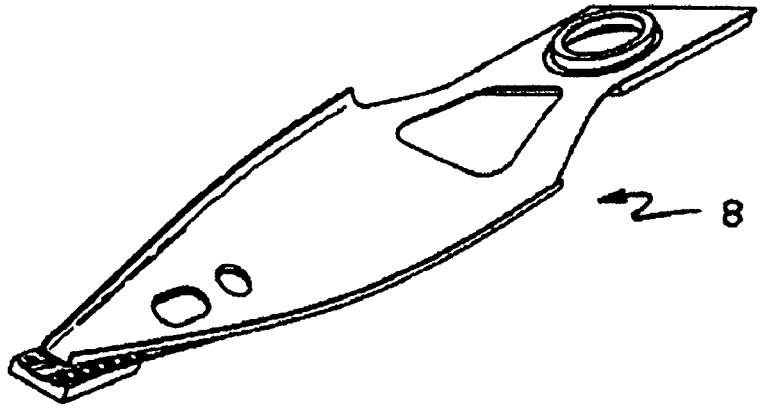
FIG. 2b is an isometric view of the suspension assembly shown in FIG. 1 undergoing twisting motion in the second torsion mode.
Figure 2C:
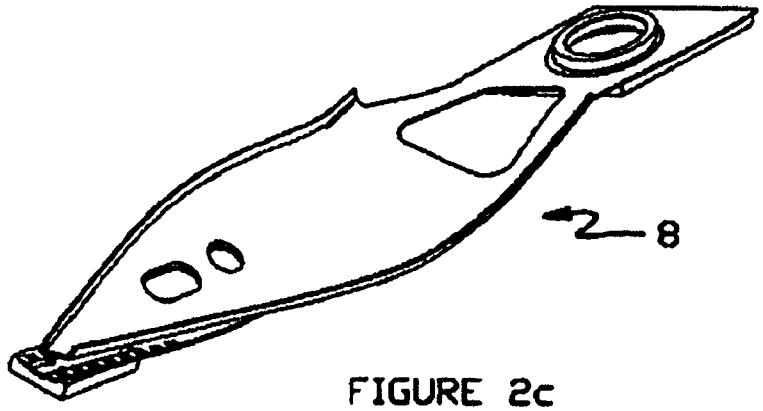
FIG. 2c is an isometric view of the suspension assembly shown in FIG. 1 undergoing bending motion in the sway mode.

This kind of motion can occur as a result of motion in resonant modes causing oscillatory excursions of a head suspension assembly about its neutral position. As is discussed generally in the Description of the Related Art section of this document, when in operation, head suspension assemblies such as 8 bend and twist in a number of different modes, known as resonant frequencies, when driven back and forth at certain rates of speeds. FIG. 2a is an illustration of suspension assembly 8 undergoing twisting motion in what is known as the first torsion mode. FIG. 2b is an illustration of suspension assembly 8 undergoing twisting motion in what is known as the second torsion mode. In both the first and second torsion modes the load beam 12 of suspension assembly 8 twists or rotates about a central, longitudinally oriented rotational axis. FIG. 2c is an illustration of suspension assembly 8 undergoing bending motion in what is known as the sway mode. In the sway mode the load beam 12 bends about an axis that is perpendicular to the base of the load beam. Typically, the sway mode exhibits a slight twisting motion as well.

Figure 10:
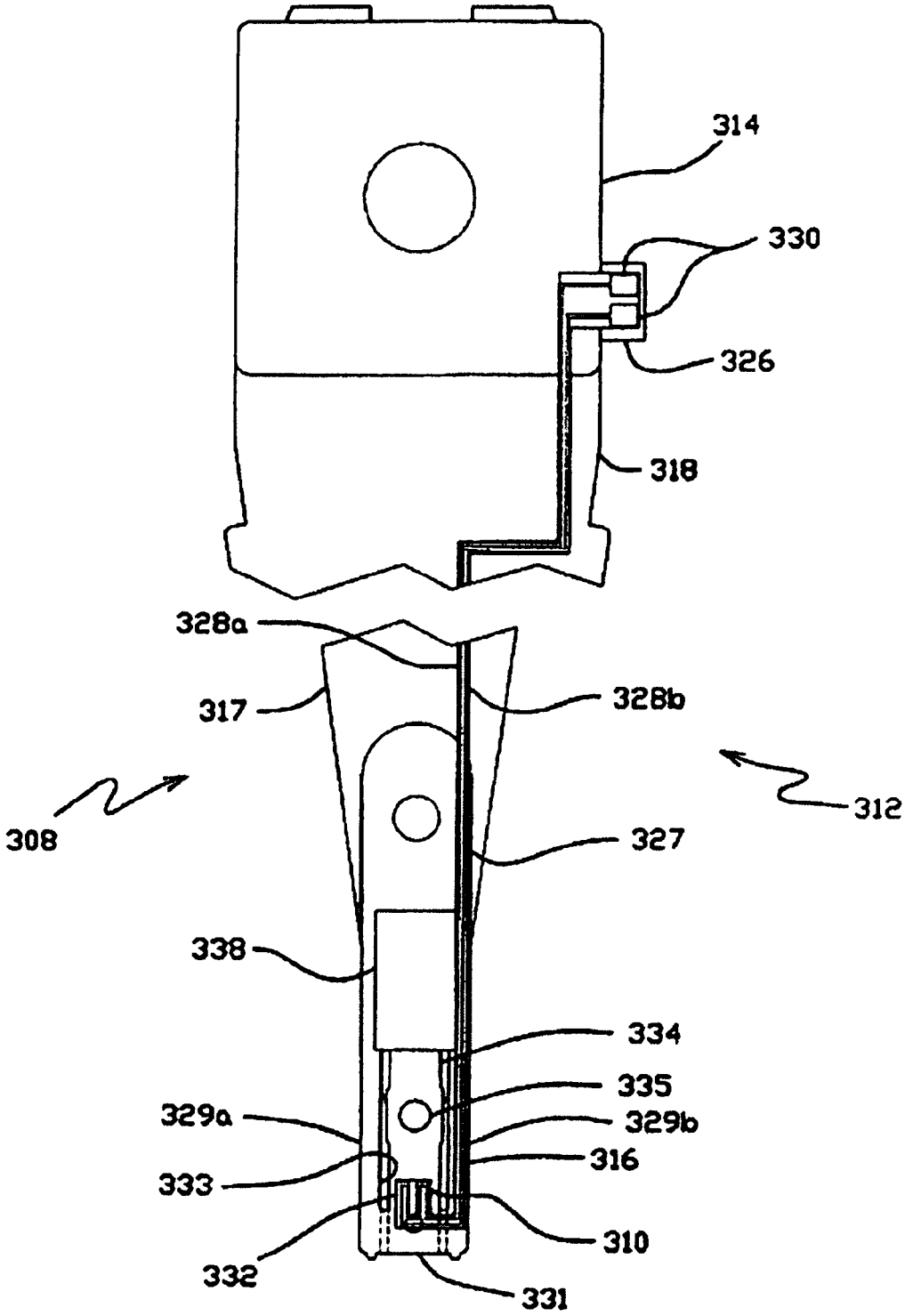
FIG. 10 is a top view of a head suspension assembly including a microactuation device and strain transducer circuit in accordance with a fifth embodiment of the present invention.

Read/write head off-neutral motion can also be caused by a microactuation device on a head suspension assembly, such as microactuator 338 shown in FIG. 10, intentionally designed to move a portion of the suspension assembly out of its neutral position.

Generally, the greater the motion of a head suspension assembly out of neutral position, the greater the strain thereon. Referring again to FIG. 1, because transducer circuit 10 is mounted to head suspension 8, strain in head suspension 8 causes strain in transducer circuit lead 32 of transducer circuit 10, varying the electrical resistance of transducer circuit 10. In this way, the electrical resistance of transducer circuit 10 varies with motion of the head attachment region 13 out of neutral position. This variation in resistance can be converted into an electrical signal using a wheatstone bridge or other methods known in the art, and used to monitor motion of the head attachment region out of neutral position, that is, read/write head off-neutral motion.

Figure 3:
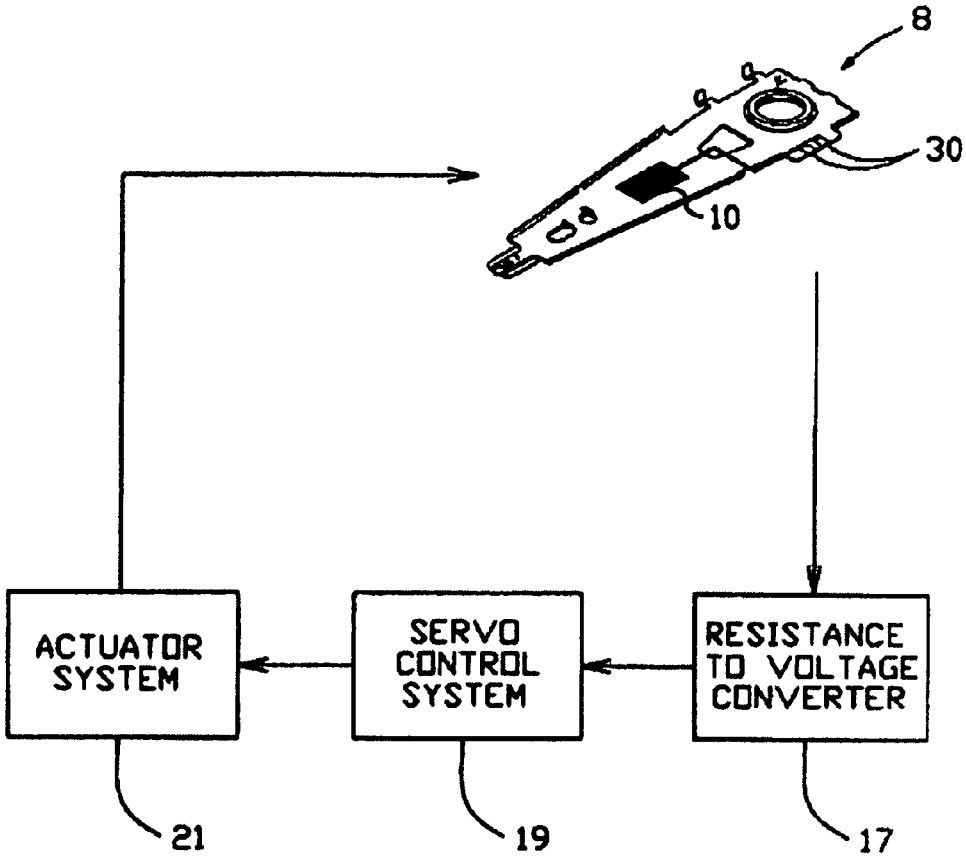
FIG. 3 is a block diagram showing a system for detecting motion of a head suspension assembly out of neutral position in accordance with the present invention.

FIG. 3 shows a block diagram of a system to monitor read/write head off-neutral motion using the transducer circuit 10 in accordance with the present invention. A deformation of head suspension assembly 8 causes read/write head off-neutral motion. Deformation of head suspension assembly 8, as explained above, also causes strain in transducer circuit lead 32 which changes the electrical resistance of transducer circuit 10. The resistance of transducer circuit 10 can be detected across contacts 30 and can then be converted into a voltage by a resistance to voltage converter 17, such as a wheatstone bridge or other well known means. The converter 17 can then be electrically connected to a servo control system 19. In this way, the servo control system 19 can be provided with the head off-neutral motion information. If necessary, servo control system 19 can then act to correct or minimize head off-neutral motion through appropriate control of actuator system 21, which can include a primary and/or secondary or micro-actuator which actuate head suspension 8. This would be desirable if, for example, head off-neutral motion was caused by resonance vibrations in head suspension assembly 8. Correction of head off-neutral motion may not be desirable, however, if it is intentionally caused by a micro-actuation device as shown in the embodiment shown in FIG. 10. In such a case, monitoring head off-neutral motion can still be important for correct placement of the load beam 12 by a primary actuator.

Figure 9:
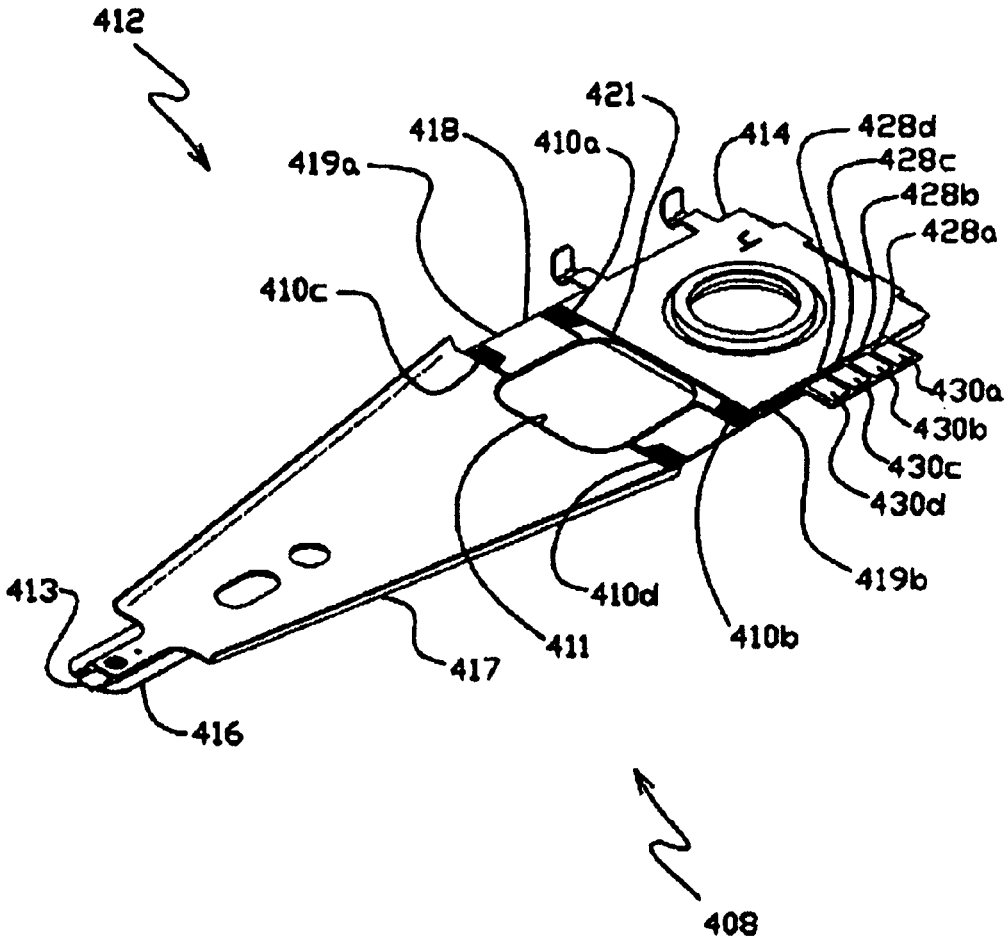
FIG. 9 is an isometric view of a head suspension assembly including an actuator arm and first, second, third, and fourth strain transducer circuits in accordance with a fourth embodiment of the present invention.

It should be noted that converter 17 can be incorporated onto the head suspension assembly itself by forming a wheatstone bridge on the suspension assembly from four strain transducer circuits as shown in FIG. 9.

The position at which transducer circuit 10 is located can be determined on the basis of the specific types of deformations that are desired to be monitored. As noted above, it is possible to use the transducer circuit 10 to detect whether the head suspension assembly 8 is undergoing motion in a resonant mode that could cause off-track error and increase read/write function time. Different resonant modes more severely strain different sections of the head suspension assembly. For monitoring off-neutral head motion in a resonant mode, it is desirable to locate the transducer circuit 10 at a location of relatively high strain for that particular resonant mode.

The location on a head suspension assembly that a particular mode strains more severely is dependent upon the design of the particular suspension assembly. Which section of a given suspension assembly is most strained for a given resonant mode (i.e. the location of the nodes for that mode) is generally known, can be determined empirically, or can be determined using methods of computer modeled finite element analysis known in the art. The transducer circuit can then be placed on the section of the suspension assembly that experiences relatively high strain during a condition of resonance in a chosen mode.

A method for manufacturing load beam 12 and transducer circuit 10 can be described with reference to FIGS. 4, 5 and 6. In the embodiment of FIG. 1, all the features of load beam 12 with the exception of the flexure 16 and baseplate 20 are manufactured from a single sheet of laminated material 40 shown in FIG. 4. FIG. 5 shows a sectional view of load beam 12 taken along line 5—5. FIG. 6 shows a sectional view of load beam 12 taken along line 6—6. Material 40 includes a lower layer 42 of stainless steel or other resilient material; an intermediate layer 44 of polyimide or other dielectric material overlaying the lower layer; and an upper layer 46 of Constantan or other material in which the resistance varies in relation to strain. Using etching or otherwise known techniques, blanks having the desired external dimensions of load beam 12 are formed from the sheet of material 40. The lower layer 42 is patterned and etched to form base 14, spring region 18, rigid region 17, and first and second edge rails 23 and 24. Intermediate layer 44 and upper layer 46 are then patterned and etched to form transducer circuit lead 32, lead wires 28a and 28b, and contacts 30. First and second edge rails 23 and 24 are then formed in the edges of load beam 17. In other embodiments (not shown), transducer circuit 10 can be separately fabricated and bonded by adhesive or other means to a conventional or otherwise manufactured load beam. Also, additive processes, such as plating, sputtering, or vapor deposition, or other processes known in the art may be used to form the transducer circuit 10 on suspension 8.

Figure 7:
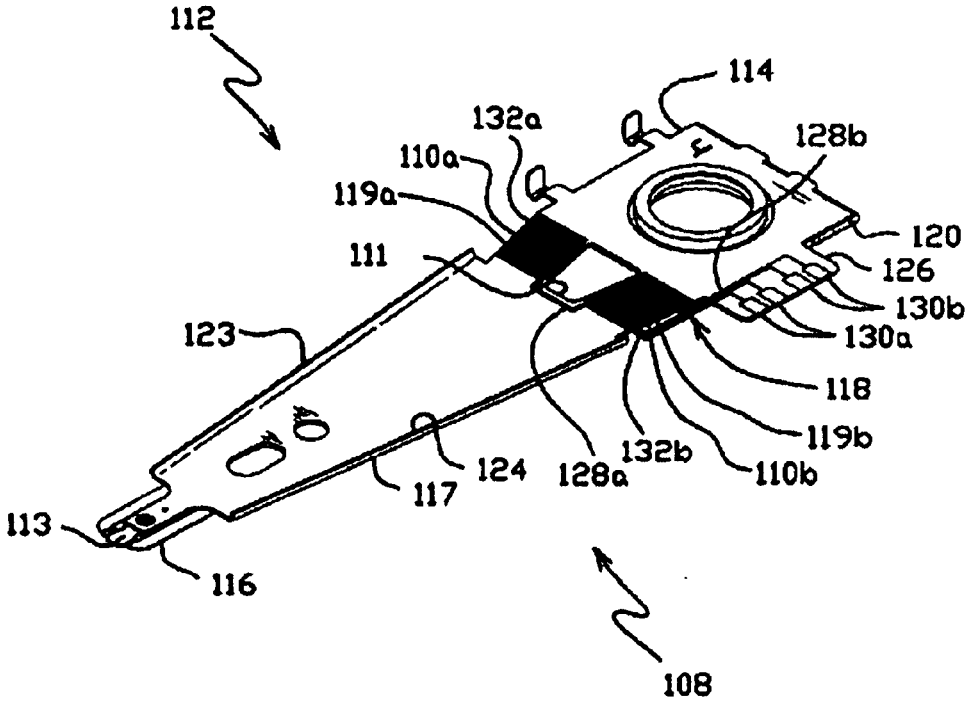
FIG. 7 is an isometric view of a head suspension assembly including first and second strain transducer circuits in accordance with a second embodiment of the present invention.

FIG. 7 is an illustration of a suspension assembly including another embodiment of the present invention. Elements in FIG. 7 which are functionally similar to those of FIG. 1 are labeled with like numerals incremented by 100. As shown in FIG. 7, a head suspension assembly 108 includes a load beam 112 having a base or mounting region 114 on a proximal end, a flexure 116 on a distal end, a relatively rigid region 117 adjacent to the flexure, and a radius or spring region 118 between the base 114 and rigid region 117. Flexure 116 includes read/write head attachment region 113. An open region 111 is formed in the transverse center of spring region 118 forming a pair of spring arms 119a and 119b. In the embodiment of FIG. 7, strain transducer circuits 110a and 110b, which act as strain gauges, are mounted on spring arms 119a and 119b, respectively. Individual transducer circuit lead 132a of transducer circuit 110a is a single connected lead that extends longitudinally back and forth in parallel sections connected at ends of the sections. Lead wires 128a connect transducer circuit 110a to contacts 130a and lead wires 128b connect transducer circuit 110b to contacts 130b. Tab 126 supports contacts 130a and 130b. Head suspension assembly 108 can be manufactured in a manner similar to that of head suspension assembly 8 shown in FIG. 1.

In the embodiment shown in FIG. 7, the transducer circuits 110a and 110b are placed in a position of relatively high strain for either the first and second torsion modes or the sway mode.

Figure 8:
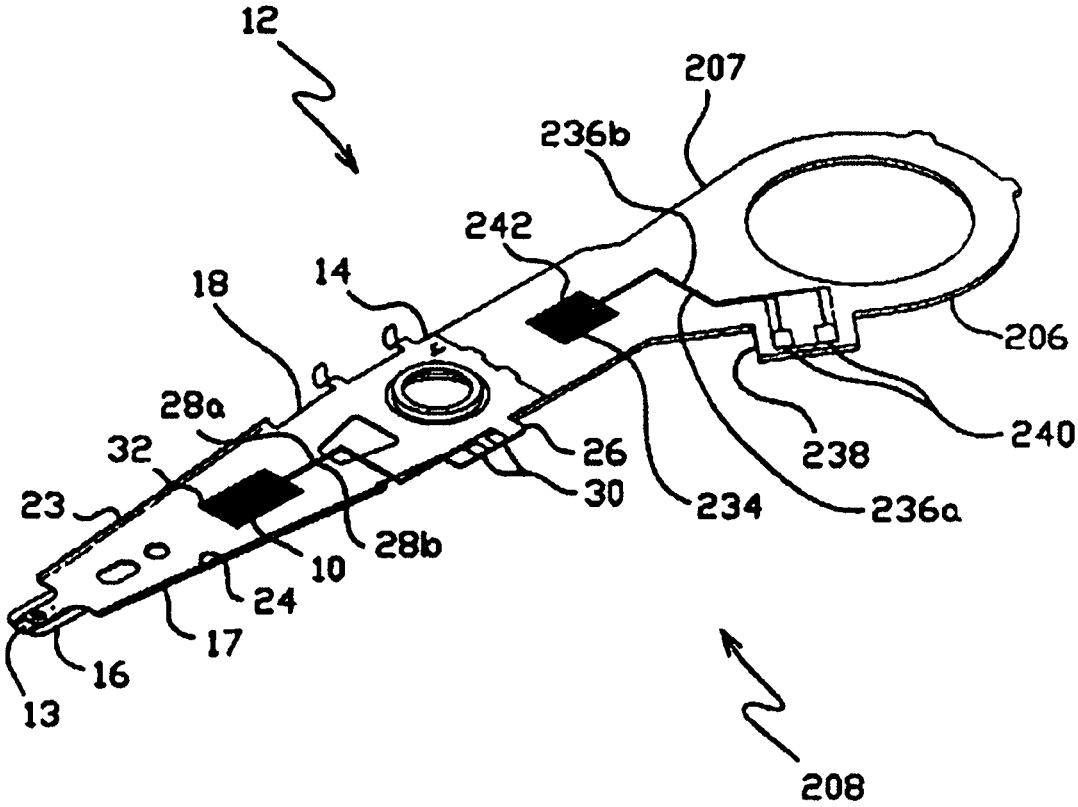
FIG. 8 is an isometric view of a head suspension assembly including an actuator arm and first and second strain transducer circuits in accordance with a third embodiment of the present invention.

FIG. 8 is an illustration of a head suspension assembly 208 including another embodiment of the present invention. In FIG. 8, the head suspension assembly 208 includes an actuator arm 207 to which the mounting region 14 of load beam 12 is attached. Actuator arm 207 is connected at base 206 to a servo actuator (not shown) and carries and positions load beam 12 above a spinning magnetic disk (not shown). A strain transducer circuit 234 which acts as a strain gauge is located on the actuator arm 207. In the embodiment of FIG. 8, individual transducer circuit lead 242 of transducer circuit 234 is a single connected lead which crosses longitudinally back and forth in parallel sections connected at the ends of the sections. As noted previously, other configurations of circuit lead 242 are also within the ambit of the present invention. Lead wires 236a and 236b connect to opposite ends of transducer circuit 234 to form a closed circuit between lead wires 236a and 236b. Tab 238 supports electrical contacts 240.

In the embodiment shown in FIG. 8, transducer circuit 10, as discussed above, detects deformation in load beam 12. Further, deformation of actuator arm 207 can cause motion of head attachment region 13 on flexure 16 out of a neutral position with respect to base 206 of actuator arm 207. Transducer circuit 242 detects deformation of actuator arm 207 and thereby detects read/write head off-neutral motion with respect to base 206 caused by deformation in actuator arm 207. The signals from transducer circuits 10 and 242 can be fed to a servo controller (not shown) to facilitate correction or control of head off-neutral motion as necessary.

Figure 4:
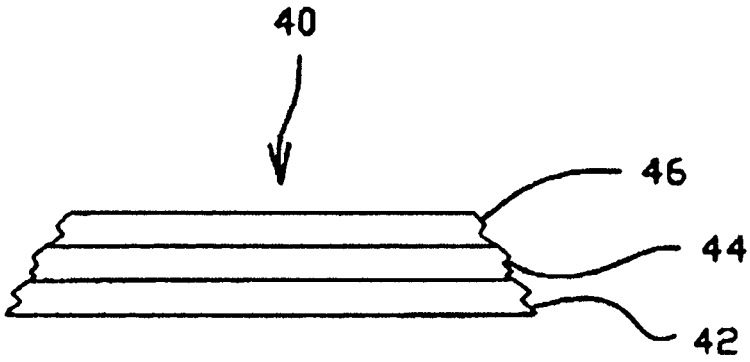
FIG. 4 is a side view of laminated sheet material from which the head suspension shown in FIG. 1 can be fabricated.

Actuator arm 207 can be manufactured from a sheet of laminated material 40 as shown in FIG. 4 having a lower layer 42 of stainless steel or other resilient material, an intermediate layer 44 of polyimide or other dielectric, and an upper layer 46 of Constantan or other material in which electrical resistance varies with strain. Using etching or otherwise known techniques, blanks having the desired external dimensions of actuator arm 207 are formed from the sheet of material 40. The lower layer 42 is patterned and etched to form base 206 and tab 238. Intermediate layer 44 and upper layer 46 are then patterned and etched to form transducer circuit lead 242, lead wires 236a and 236b, and contacts 240. In other embodiments (not shown), transducer circuit 234 can be separately fabricated and bonded by adhesive or other means to a conventional or otherwise manufactured actuator arm. Load beam 12 can be mounted to actuator arm 207 by welding or other known means. Also, additive processes, such as plating, sputtering, or vapor deposition, or other processes known in the art may be used to form the transducer circuit 234 on actuator arm 207.

FIG. 9 is an illustration of a suspension assembly showing another embodiment of the present invention. Elements [if] *in* FIG. 9 which are functionally similar to those of FIG. 1 are shown with like numerals incremented by 400. As shown in FIG. 9, a head suspension assembly 408 includes a load beam 412 having a base or mounting region 414 on a proximal end, a flexure 416 on a distal end, a relatively rigid region 417 adjacent to the flexure, and a radius or spring region 418 between the base 414 and rigid region 417. Flexure 416 includes read/write head attachment region 413. An open region 411 is formed in the transverse center of spring region 418 forming a pair of spring arms 419a and 419b. In the embodiment of FIG. 9, first and second strain transducer circuits 410a and 410c are mounted on spring arm 419a and third and [forth] *fourth* strain transducer circuits 410b and 410d are mounted on spring arm 419b. Transducer circuits 410a, 410b, 410c and 410d are electrically connected together by electrical lead 421 to form a wheatstone bridge circuit. This wheatstone bridge circuit is then connected by electrical leads 428a, 428b, 428c, and 428d to electrical contacts 430a, 430b, 430c, and 430d, respectively. In this way, read/write head off neutral motion of suspension assembly 408 can be detected directly as a voltage and the need for an external resistance to voltage converter is obviated. Head suspension assembly 408 can be manufactured in a manner similar to that of head suspension assembly 8 shown in FIG. 1.

FIG. 10 is an illustration of a suspension assembly showing yet another embodiment of the present invention. Elements in FIG. 10 which are functionally similar to those of FIG. 1 are shown with like numerals incremented by 300. FIG. 10 shows a head suspension assembly 308 including a load beam 312 having a base or mounting region 314 on a proximal end, a T-type flexure 316 on a distal end, a relatively rigid region 317 adjacent to the flexure, and a spring region 318 between the base 314 and the rigid region 317.

Flexure 316 includes a mounting portion 327, a pair of spaced arms 329a and 329b which extend from the mounting portion 327, and a cross member 331 which extends between the distal ends of arms 329a and 329b. The arms 329a and 329b and cross member 331 form gap 333 through the distal end of flexure 316. A tongue 334 extends from the cross member 331 into gap 333 toward load beam base 314. Cross member 331 is offset from arms 329a and 329b so the plane of the cross member 331 and tongue 334 are offset from the plane of the arms 329a and 329b. Tongue 334 also includes a conventional load point dimple 335. A slider (not shown) with a read/write head (not shown) is adhesively bonded or otherwise mounted to tongue 334 to form a head suspension assembly from suspension 308.

A microactuator 338 is positioned at the distal end of tongue 334 and is configured to move tongue 334 laterally between arms 329a and 329b in response to tracking control signals. The details of such a microactuator is disclosed in U.S. patent application Ser. No. 08/457,432 filed Jun. 6, 1995 by Jurgenson et al. for a Head Suspension with Tracking Microactuator. Any other suitable microactuator is also contemplated to be used in conjunction with the present invention. As microactuator 338 moves tongue 334, the read/write head (not shown) is moved beneath load point dimple 335 to be placed above a correct information track in a spinning magnetic disk (not shown).

As tongue 334 is moved between arms 329a and 329b the distal end of tongue 334 elastically deforms and causes strain in tongue 334. A strain transducer circuit 310 which acts as a strain gauge is located at the distal end of tongue 334. Individual transducer circuit lead 332 is configured to extend longitudinally back and forth in parallel sections connected at ends of the sections. As above, other configurations of circuit lead 332 are also within the ambit of the present invention. Lead wires 328a and 328b connect to opposite ends of transducer circuit 310 to form a continuous closed circuit between lead wires 328a and 328b. Lead wires 328a and 328b connect to contacts 330 on tab 326.

Deformation of the distal end of tongue 334 causes strain therein. This strain causes strain in circuit lead 332 and increasing the resistance of transducer circuit 310. The resistance of transducer circuit 310 can be detected across contacts 330 and may be converted into a voltage by a resistance to voltage transducer (not shown) such as a wheatstone bridge or other known means. This signal can then be provided to a servo controller (not shown) and even fed back to microactuator 338 to monitor the position of the read/write head over information tracks (not shown). Head suspension assembly 308 can be manufactured in a manner similar to that of head suspension assembly 8 shown in FIG. 1.

Though the present invention has been described with reference to preferred embodiments, those skilled in the art will recognize that changes can be made in form and detail without departing from the spirit and scope of the invention.

What is claimed is:

1. A *disk drive assembly, including:*

*a* head suspension assembly in which resonance mode motion can induce strain, the head suspension assembly comprising:

a load beam having a proximal end, a distal end, a mounting region on the proximal end, a rigid region adjacent to the distal end and a spring region between the rigid region and the mounting region;

a flexure for supporting a read/write head at the distal end of the load beam; and at least one strain transducer circuit on the head suspension assembly for detecting strain therein such that the strain transducer circuit detects resonance mode motion of the head suspension assembly;

*a controller connected to the strain transducer circuit, for providing drive signals as a function of the strain detected by the transducer circuit; and*

*an actuator mechanically connected to the head suspension assembly and electrically connected to the controller, for driving and positioning the suspension assembly as a function of the drive signals.*

2. The [head suspension] *disk drive* assembly of claim 1 wherein the strain transducer circuit is located on the load beam.

3. The [head suspension] *disk drive* assembly of claim 1 wherein the load beam includes a spring region between the rigid region and the mounting region and further wherein the strain transducer circuit is located in the spring region.

4. The [head suspension] *disk drive* assembly of claim 1 wherein the strain transducer circuit is located on the rigid region of the load beam.

5. The [head suspension] *disk drive* assembly of claim 1 wherein the flexure includes a head attachment region for supporting a read/write head at the distal end of the load beam and wherein an elastic deformation of the head suspension assembly can displace the head attachment region from a neutral position and generate strain in the head suspension assembly.

6. The [head suspension] *disk drive* assembly of claim 5 wherein the strain transducer circuit has an electrical resistance which varies with strain in the head suspension assembly at a position of the strain transducer circuit thereon such that the resistance in the strain transducer circuit varies with deformation of the head suspension assembly to allow detection of motion of the head mounting region out of the neutral position.

7. The [head suspension] *disk drive* assembly of claim 6 wherein the strain transducer circuit is located on the load beam.

8. The [head suspension] *disk drive* assembly of claim 6 wherein the strain transducer circuit includes a single strain gauge lead having an electrical resistance that varies with strain on the lead.

9. The [head suspension] *disk drive* assembly of claim 8 wherein the strain gauge lead is formed of Constantan.

10. The [head suspension] *disk drive* assembly of claim 5 wherein the strain transducer circuit is located in the spring region.

11. The [head suspension] *disk drive* assembly of claim 10 including a first strain transducer circuit and a second train transducer circuit wherein the spring region has an open region that divides the spring region into first and second radius arms and the first strain transducer circuit is located on the first radius arm and the second strain transducer circuit is located on the second radius arm.

12. The [head suspension] *disk drive* assembly of claim 1 wherein the strain transducer circuit is on the flexure.

13. The [head suspension] *disk drive* assembly of claim 1 including first, second, third and fourth strain transducer circuits wherein the spring region has an open region that divides the spring region into first and second radius arms and the first and second strain transducer circuits are located on the first radius arm, the third and fourth strain transducer circuits are located on the second radius arm, and the first, second, third and fourth strain transducer circuits are interconnected to form a wheatstone bridge circuit.

14. A *disk drive assembly, including:*

*a* head suspension assembly comprising:

a load beam having a proximal end, a distal end, a mounting region on the proximal end, a rigid region adjacent to the distal end and a spring region between the rigid region and the mounting region;

a flexure having a head attachment region for supporting a read/write head and at the distal end of the load beam, the head attachment region displaceable from a neutral position, such displacement causing strain in the head suspension assembly;

a microactuator on the head suspension assembly between the mounting region and the head attachment region and to displace the head attachment region from the neutral position and along a transverse tracking axis; and at least one strain transducer circuit on the head suspension assembly for detecting strain in the head suspension assembly wherein displacement of the head attachment region from the neutral position caused by the microactuator is detected by the strain transducer circuit;

*a controller connected to the strain transducer circuit, for providing signals as a function of the strain detected by the transducer circuit; and*

*an actuator mechanically connected to the head suspension assembly and electrically connected to the controller, for driving and positioning the suspension assembly as a function of the signals provided by the strain transducer circuit.*

15. The [head suspension] *disk drive* assembly of claim 14 wherein the strain transducer is located on the load beam.

16. The [head suspension] *disk drive* assembly of claim 14 wherein the strain transducer circuit has an electrical resistance which varies with strain in the head suspension assembly at a position of the strain transducer circuit thereon.

17. The [head suspension] *disk drive* assembly of claim 16 wherein the strain transducer circuit includes a single strain gauge lead having an electrical resistance that varies with strain on the lead.

18. A *disk drive assembly, including:*

*a* head suspension assembly in which resonance mode motion can induce strain, comprising:

a load beam having a proximal end, a distal end, a mounting region on the proximal end, a rigid region adjacent to the distal end and a spring region between the rigid region and the mounting region;

an actuator arm having a proximal end and a distal end, the proximal end of the load beam mounted to the distal end of the actuator arm;

a flexure for supporting a read/write head and at the distal end of the load beam; and

[at least one strain transducer circuit on the head suspension assembly for detecting strain in the head suspension assembly such that the strain transducer circuit detects resonance frequency vibrations of the head suspension assembly]

*at least a first strain transducer circuit located on the actuator arm and at least a second strain transducer circuit located on the load beam such that at least one of the first strain transducer circuit and the second strain transducer circuit detects resonance frequency vibrations of the head suspension assembly;*

*a controller connected to at least the first and the second strain transducer circuits, for providing drive signals as a function of the strain detected by at least the first and the second strain transducer circuits; and*

*an actuator mechanically connected to the head suspension assembly and electrically connected to the controller, for driving and positioning the suspension assembly as a function of the drive signals.*

[19. The head suspension assembly of claim 18 wherein the strain transducer circuit has an electrical resistance which varies with strain in the head suspension assembly at a position of the strain transducer circuit thereon.]

[20. The head suspension assembly of claim 18 wherein the strain transducer circuit is located on the actuator arm.]

[21. The head suspension assembly of claim 18 including a first strain transducer circuit and a second state transducer circuit wherein the first strain transducer circuit is located on the actuator arm and the second strain transducer circuit is located on the load beam.]

*22. The disk drive assembly of claim 1 wherein the controller produces drive signals for reducing head off-neutral motion.*

*23. The disk drive assembly of claim 14 wherein the controller produces drive signals for reducing head off-neutral motion.*

*24. The disk drive assembly of claim 14 wherein the controller is electrically connected to the microactuator.*

*25. The disk drive assembly of claim 18 wherein the controller produces drive signals for reducing head off-neutral motion.*

* * * * *

UNITED STATES PATENT AND TRADEMARK OFFICE

CERTIFICATE OF CORRECTION

PATENT NO. : RE 40,975 E
APPLICATION NO. : 11/452076
DATED : November 17, 2009
INVENTOR(S) : Robert B. Evans et al.

It is certified that error appears in the above-identified patent and that said Letters Patent is hereby corrected as shown below:

Column 9, line 45, delete "train" and insert therefor --strain--

Signed and Sealed this

Twenty-seventh Day of April, 2010

David J. Kappos

David J. Kappos
*Director of the United States Patent and Trademark Office*